(12) United States Patent
Henderson et al.

(10) Patent No.: US 7,258,132 B2
(45) Date of Patent: Aug. 21, 2007

(54) ELECTRONICALLY CONTROLLED BACK PRESSURE REGULATOR

(75) Inventors: Robert Clark Henderson, Avondale, PA (US); Bruce D. Quimby, Lincoln University, PA (US)

(73) Assignee: Agilent Technologies, Inc., Santa Clara, CA (US)

( * ) Notice: Subject to any disclaimer, the term of this patent is extended or adjusted under 35 U.S.C. 154(b) by 277 days.

(21) Appl. No.: 10/871,930

(22) Filed: Jun. 18, 2004

(65) Prior Publication Data

US 2005/0279408 A1 Dec. 22, 2005

(51) Int. Cl.
*G01N 30/32* (2006.01)
*G05D 7/06* (2006.01)

(52) U.S. Cl. .............. 137/487.5; 137/14; 137/613; 73/23.36; 73/23.42; 96/102

(58) Field of Classification Search ............ 137/14, 137/487.5; 73/23.27, 23.35, 23.36, 23.42, 73/23.24; 96/102
See application file for complete search history.

(56) References Cited

U.S. PATENT DOCUMENTS 3,240,052 A * 3/1966 Reinecke et al. .......... 73/23.27
4,196,612 A    4/1980 Clardy et al.
4,359,891 A * 11/1982 Ahlstrom et al. ........... 73/23.22
4,984,602 A *  1/1991 Saito et al. ................ 137/487.5
5,163,979 A * 11/1992 Patrick et al. .................. 95/19
5,431,712 A *  7/1995 Henderson et al. ............. 95/22
5,567,227 A * 10/1996 Henderson ..................... 95/22
6,595,231 B1*  7/2003 Best ............................ 137/14
2004/0238040 A1 12/2004 Furukawa

FOREIGN PATENT DOCUMENTS

EP    0275933 A2   1/1988
EP    0770869 A2   6/1999
GB    2297046 A    7/1996

OTHER PUBLICATIONS

Search Report Dated: Aug. 17, 2005.

* cited by examiner

*Primary Examiner*—Ramesh Krishnamurthy (57) ABSTRACT

An electronically controlled back pressure regulator comprises an analysis device having a vent coupled to the analysis device through a vent path, a pressure sensor coupled to the vent path, a proportional valve coupled to the vent path, the proportional valve configured to controllably alter pressure in the analysis device, and an electronically controlled closed-loop controller configured to control a flow through the vent based on a signal from the pressure sensor and an electronically controlled pressure setpoint.

13 Claims, 9 Drawing Sheets

ELECTRONICALLY CONTROLLED BACK PRESSURE REGULATOR

BACKGROUND

Many analysis applications, such as gas chromatography, require a regulated pressure of a fluid in order to obtain accurate and repeatable measurements. For example, when preparing to deliver a gaseous sample into an analysis column of a gas chromatograph, the sample is first collected in what is referred to as a "sample loop," and then, under the control of a gas sampling valve, directed (also referred to as "injected") into the analysis column of the chromatograph. When loading the sample fluid in the sample loop, the amount of a gaseous sample is dependent upon many factors, one of which is the pressure of the fluid in the sample loop. Changes in the ambient pressure (also referred to as barometric pressure) affect the amount of sample molecules contained in the sample volume, resulting in variability of the absolute amount of compounds detected by the chromatographic analysis.

Further, because the sample loop is typically vented to ambient pressure, the absolute amount of molecules contained in the sample loop is less than if the sample loop were at an elevated pressure. This results in a smaller amount of molecules being injected into the chromatographic column for analysis, thus limiting the accuracy of the analysis. Further, because the sample loop is at a relatively low gauge pressure compared to the inlet pressure of the chromatograph into which the sample is injected, there is a resulting pressure and flow disturbance when the contents of the sample loop are injected into chromatograph. This pressure and flow disturbance further reduces the accuracy of the chromatographic analysis.

Prior solutions include the implementation of a mechanical absolute back pressure regulator and pressure accumulator, in which the mechanical pressure regulator becomes the reference for all flows within the chromatograph. However, drawbacks of such a system include the requirement that the mechanical back pressure regulator be frequently calibrated off-line from the system, a lack of programmability and adjustability. Also, because all flows in such a system are referenced to a mechanical pressure regulator, and because mechanical pressure regulators are sensitive to flow, variations in the flow through the regulator, which affect the actual pressure in the system, can manifest as noise on the analysis output, further reducing the accuracy of the analysis.

Further, because all flows in such a system travel through the absolute pressure regulator, any sample components that become chemically active when ionized (e.g., by a flame ionization detector) will likely react and corrode portions of the regulator, thus reducing regulator service life. Further, as the regulator ages due to mechanical drift or as a result of the chemicals passing through the regulator, the results of the analysis will become less reliable.

Accordingly, a need exists for a back pressure regulator in a chromatographic analysis system that overcomes the above-mentioned shortcomings.

SUMMARY OF INVENTION

According to one embodiment, an electronically controlled back pressure regulator comprises an analysis device having a vent coupled to the analysis device through a vent path, a pressure sensor coupled to the vent path, a proportional valve coupled to the vent path, the proportional valve configured to controllably alter pressure in the analysis device; and an electronically controlled closed-loop controller configured to control a flow through the vent based on a signal from the pressure sensor and an electronically controlled pressure setpoint.

Other methods, aspects and advantages of the invention will be discussed with reference to the figures and to the detailed description of the preferred embodiments.

BRIEF DESCRIPTION OF THE FIGURES

The invention will be described by way of example, in the description of exemplary embodiments, with particular reference to the accompanying figures in which.

DETAILED DESCRIPTION

While described below for use in a gas chromatograph, the electronically controlled back pressure regulator is applicable to other analysis devices, such as a liquid chromatograph, in which it is desirable to control the back pressure of the device. Further, although not an inclusive list, the electronically controlled back pressure regulator can be used to regulate the pressure of a vapor above a liquid or solid sample (referred to as a "headspace sampler); can be used to vary the concentration of a sample in a sample loop to provide multi-level calibration of a chromatographic detector; can be used to control and vary the pressure when determining caloric content of natural gas; and can be used in a gas mixing system to calibrate analytic instrumentation that is used to produce measurement data on multiple compounds simultaneously.

Figure 1:
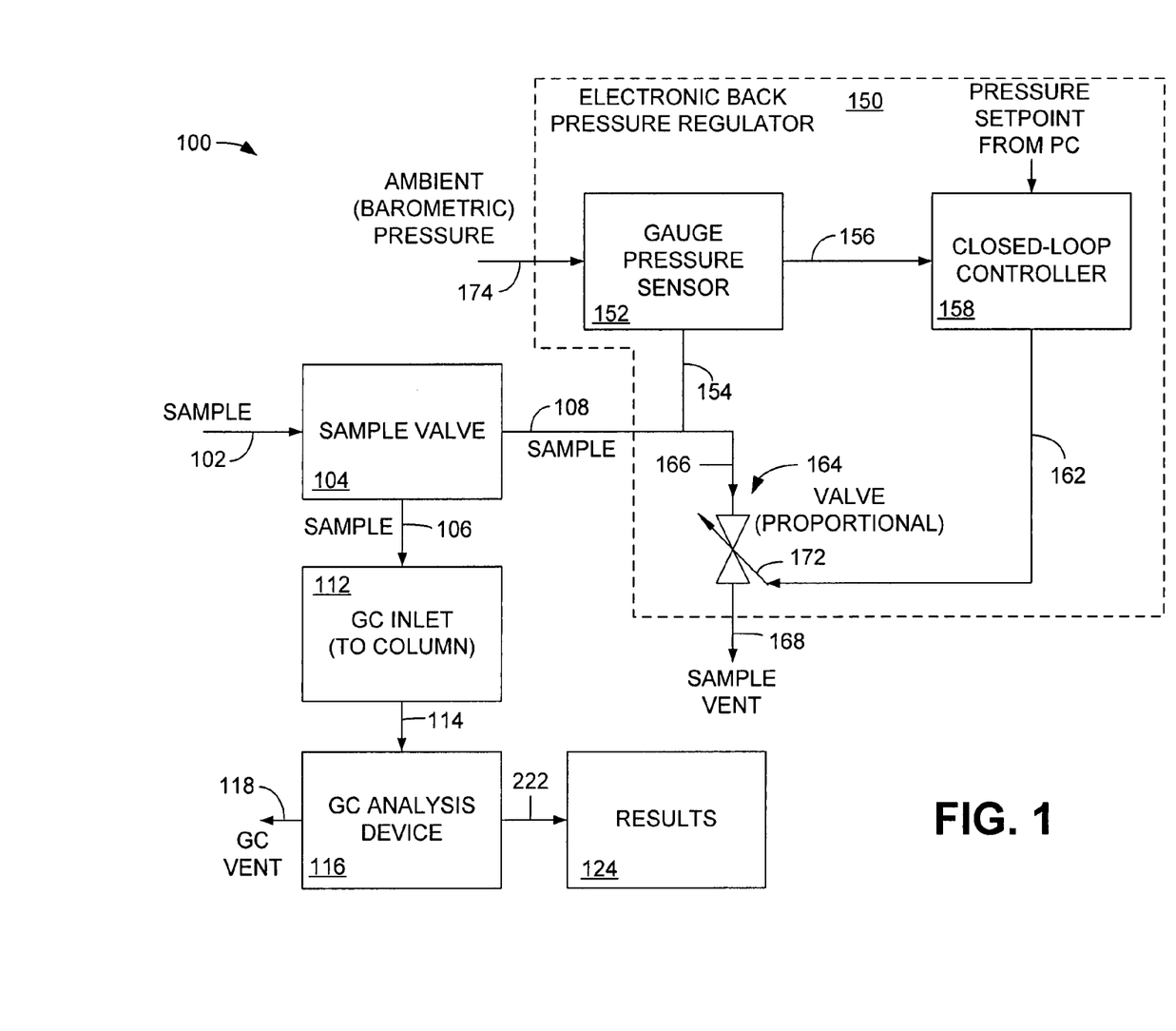
FIG. 1 is a block diagram illustrating portions of an exemplary gas chromatograph (GC) including an embodiment of an electronically controlled back pressure regulator.

FIG. 1 is a block diagram illustrating portions of an exemplary gas chromatograph (GC) 100 including an embodiment of an electronically controlled back pressure regulator. The GC 100 includes a sample valve 104, a GC inlet 112 (which leads to a chromatographic column (not shown), and a GC analysis device 116. The GC analysis device 116 analyzes sample material and provides results 124. The GC analysis device 116 is vented to the atmosphere via a GC vent 118.

A sample is introduced via connection 102 to the sample valve 104. As will be described in greater detail below, the output of a sample valve can be directed via connection 106 to the GC inlet 112 or via connection 108 to a sample vent 168. During a load operation, the sample valve 104 directs the sample into what is referred to as a "sample loop" (not shown in FIG. 1). When directed by the sample valve 104, the sample is injected from the sample loop into the GC inlet 112.

The sample valve 104 can also direct the sample via connection 108, through connection 166 and through a proportional valve 164 to the sample vent 168. In accordance with an embodiment of the invention, the proportional valve 164 is electronically controllable via connection 172. A closed loop controller 158 controls the operation of the sample valve 168. While described in this example as coupled to a sample vent, the electronic back pressure regulator 150 may be implemented in any application in which it is desirable to provide electronic back pressure control. For example, the electronic back pressure regulator 150 can be used to provide pressure regulation of a carrier or a switching gas in an analysis system.

The closed loop controller 158 is part of an electronic back pressure regulator 150. The electronic back pressure regulator 150 includes a gauge pressure sensor 152 coupled to connection 108 to sense the gauge pressure at the output of the sample valve 104 via connection 154. The gauge pressure sensor 152 measures pressures relative to ambient (barometric) pressure by sensing ambient pressure on connection 174 and sensing the pressure on connection 108. The gauge pressure sensor 152 delivers a signal via connection 156 to the closed loop controller 158 indicative of the pressure on connection 108. A pressure setpoint can be electronically programmed into the closed loop controller. The pressure setpoint can also be electronically controlled via, for example, a personal computer, or other controller, to be described below, according to user input or according to a program. Using the pressure setpoint information and the pressure signal from the gauge pressure sensor 152, the closed loop controller 158 controls the adjustable input 172 of the proportional valve 164 via connection 162 to controllably alter the pressure at the output 108 of the sample valve 104. In this manner, the pressure inside the sample loop, and the pressure as the sample is injected into the GC inlet 112, can be controlled based on the user entered setpoint, or on a programmed pressure setting.

Figure 2A:
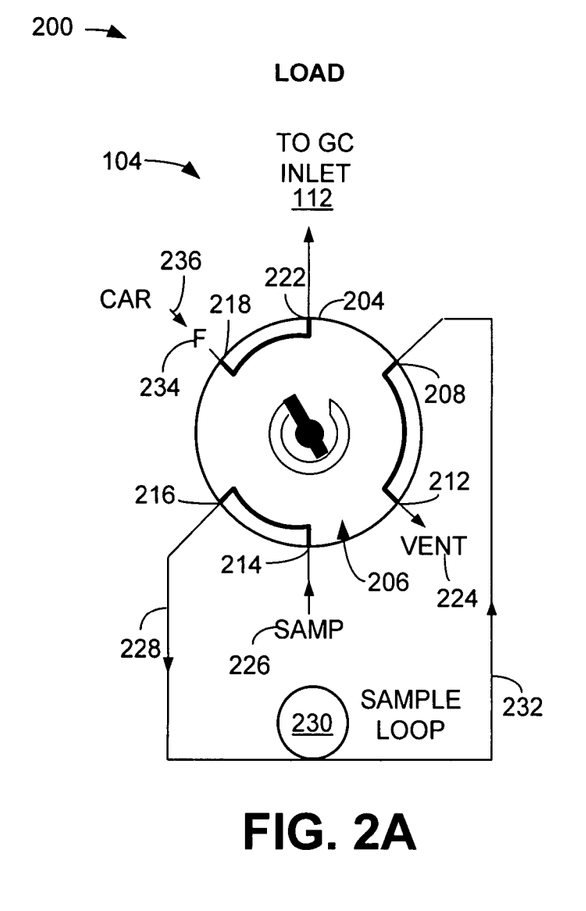
FIGS. 2A and 2B are a schematic diagram illustrating the sample valve of FIG. 1.
Figure 2B:
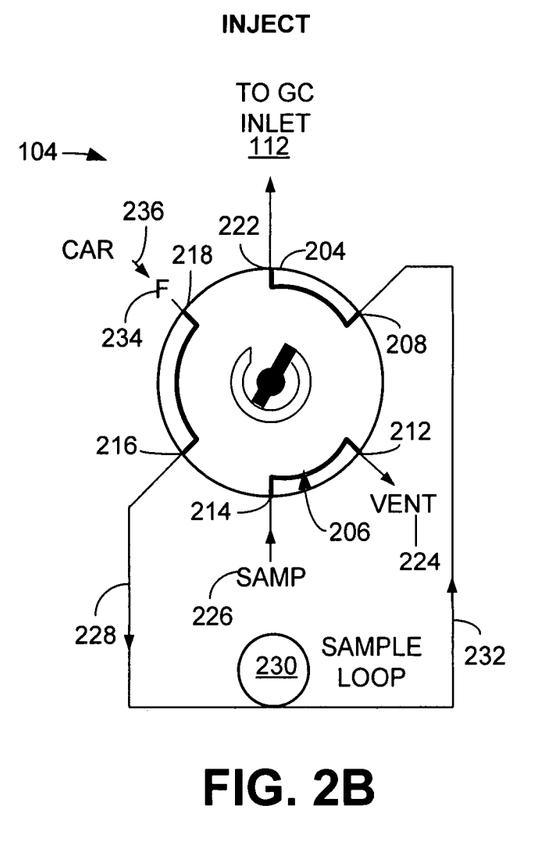

FIGS. 2A and 2B are a schematic diagram 200 illustrating the sample valve 104 of FIG. 1. Referring to FIG. 2A, the sample valve 104 includes a valve body 204 and a rotor 206. The sample valve 104 includes a first port 208, a vent port 212, a sample port 214, a second port 216, a carrier gas port 218 and column port 222. FIG. 2A illustrates the sample valve 104 in a "load" state. A carrier gas source 236 controlled by a flow controller 234 supplies carrier gas through port 218, through the sample valve 104, out of the column port 222 and into the GC inlet 112. In the load state, a sample 226 is introduced via sample port 214, through the port 216 onto conduit 228 and into the sample loop 230. The sample fills the sample loop 230, exits the sample loop via conduit 232, enters the valve 104 via port 208, and exits the valve 104 via port 212 through the vent 224. The sample loop is loaded with the sample material and vented via vent 224.

FIG. 2B illustrates the sample valve 104 in what is referred to as the "inject" state. In the inject state, the carrier gas 236 flows through the flow controller 234 into port 218, out of port 216 into conduit 228 and through the sample loop 230. The carrier gas 236 forces the sample material in the sample loop 230 through conduit 232, into port 208, and out of port 222 into the GC inlet 112. While in the inject state, the sample 226 is directed through the valve 104 to the vent 224.

As described above, the amount of sample contained in the sample loop 230 can be controlled by controlling the back pressure applied to the connection 108 in FIG. 1, which corresponds to the port 212 and the vent 224 in FIGS. 2A and 2B. Further, by using the closed loop controller 158 and the user defined setpoint or the electronically programmed setpoint, to elevate the back pressure applied to connection 108 of FIG. 1, the pressure within the sample loop 230 (FIGS. 2A and 2B) can be elevated so that additional sample material may be loaded into the sample loop 230, resulting in increased sensitivity of the GC analysis device 116. Furthermore, adjusting the back pressure to a pressure similar to the pressure at the GC inlet 112 minimizes any pressure and resulting flow disturbances resulting from the injection of the sample into the inlet, thus improving the precision of the analysis provided by the GC analysis device 116.

Figure 3:
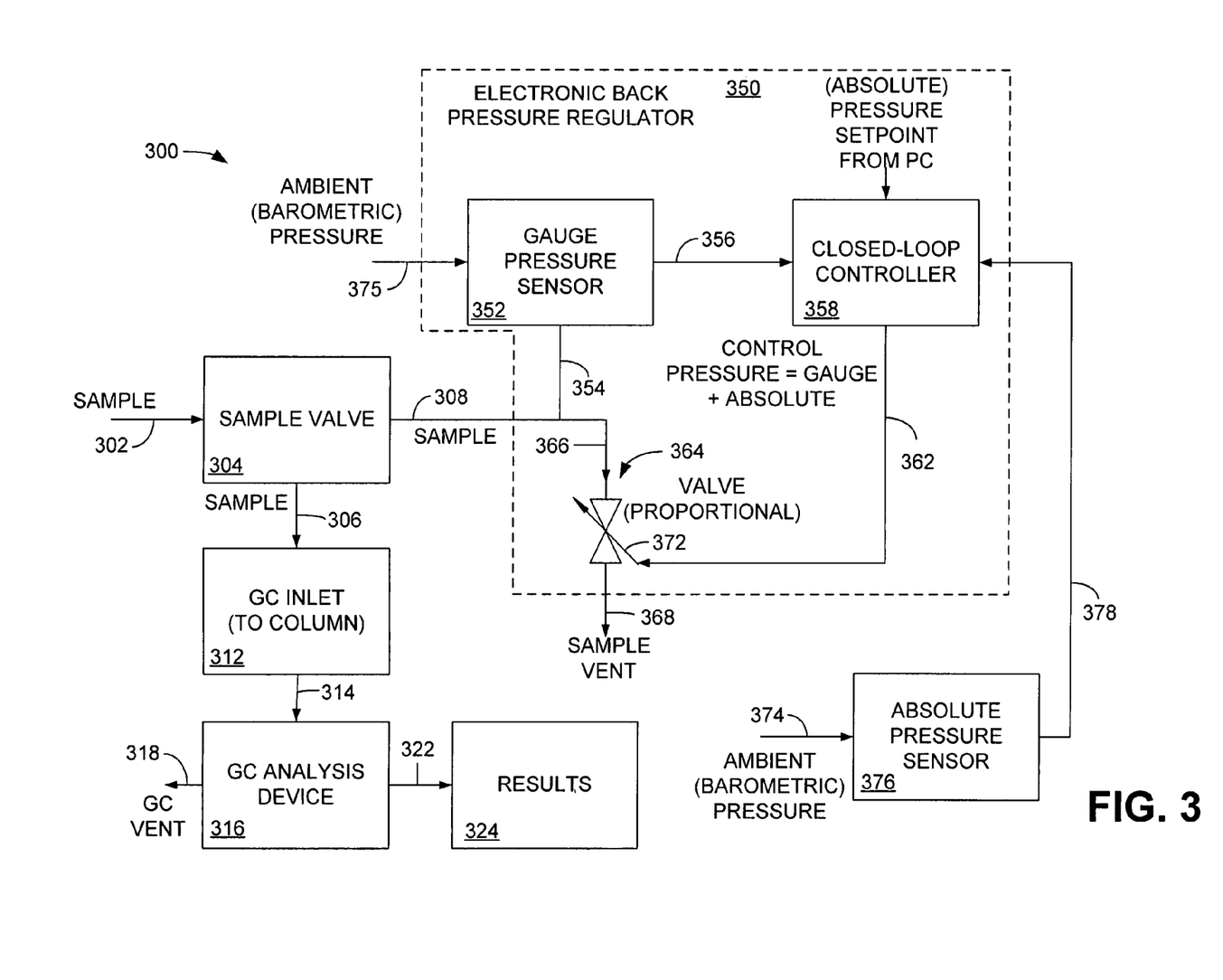
FIG. 3 is a block diagram illustrating an alternative embodiment of the portion of the gas chromatograph shown in FIG. 1.

FIG. 3 is a block diagram illustrating an alternative embodiment of the portion of the gas chromatograph shown in FIG. 1. The GC 300 includes a sample valve 304, a GC inlet 312 (which leads to a chromatographic column (not shown), and a GC analysis device 316. The GC analysis device 316 analyzes sample material and provides results 324. The GC analysis device 316 is vented to the atmosphere via a GC vent 318. A sample is introduced via connection 302 to the sample valve 304. The sample valve 304 operates similar to the sample valve 104 described above.

The closed loop controller 358 is part of an electronic back pressure regulator 350. In this embodiment, the electronic back pressure regulator 350 includes a gauge pressure sensor 352 coupled to ambient pressure on connection 375 and on connection 308 to sense the gauge pressure at the output of the sample valve 304 via connection 354. The gauge pressure sensor 352 delivers a signal via connection 356 to the closed loop controller 358 indicative of the pressure on connection 308.

In this embodiment, an absolute pressure sensor 376 that senses ambient (barometric) pressure via connection 374 supplies an absolute pressure signal via connection 378 to the closed loop controller 358. In an absolute pressure sensor one side of the diaphragm in the pressure sensor is not vented to ambient pressure, but is connected to an evacuated volume, so that it measures a pressure relative to a vacuum, not relative to ambient pressure. In this embodiment, the closed loop controller 358 has two pressure sensor inputs, the standard gauge pressure sensor input from gauge sensor 352 and the absolute pressure input from the absolute pressure sensor 376. The closed loop controller 358 can arithmetically combine the two pressure sensor readings to determine the absolute pressure at the connection 354. This capability allows a user to set an absolute back pressure setpoint to control the pressure in the sample loop (FIGS. 2A and 2B), or to have the absolute back pressure programmed by the chromatograph as part of a method start-up procedure.

An absolute pressure setpoint can be electronically programmed into the closed loop controller 358. The pressure setpoint can also be electronically controlled via, for example, a personal computer, or other controller, to be described below, according to user input or according to a program. Using the absolute pressure setpoint information and the pressure signal from the gauge pressure sensor 352, the closed loop controller 358 controls the adjustable input 372 of the proportional valve 364 via connection 362 to controllably alter the pressure at the output 308 of the sample valve 304. In this manner, the pressure inside the sample loop, and the pressure as the sample is injected into the GC inlet 312, can be controlled based on the user entered setpoint, or on a programmed pressure setting. Such an implementation allows the GC 300 to provide a sample stream that is largely independent of barometric pressure, and allows the absolute back pressure of the GC 300 to be electronically controlled.

Figure 4:
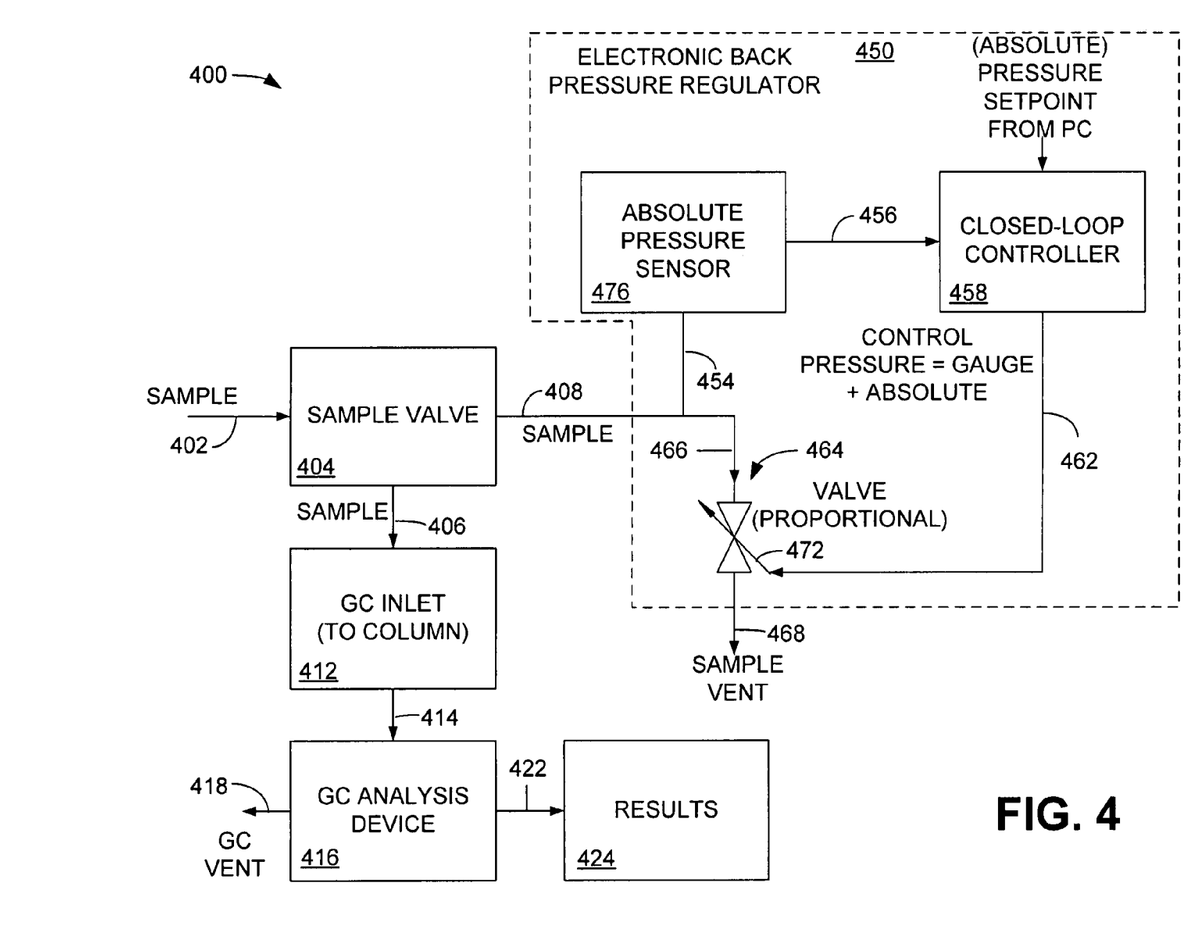
FIG. 4 is block diagram illustrating an alternative embodiment of the portion of the gas chromatograph shown in FIG. 1.

FIG. 4 is block diagram 400 illustrating an alternative embodiment of the portion of the gas chromatograph shown in FIG. 1. The GC 400 includes a sample valve 404, a GC inlet 412 (which leads to a chromatographic column (not shown), and a GC analysis device 416. The GC analysis device 416 analyzes sample material and provides results 424. The GC analysis device 416 is vented to the atmosphere via a GC vent 418. A sample is introduced via connection 402 to the sample valve 404. The sample valve 404 operates similar to the sample valve 104 described above.

The closed loop controller 458 is part of an electronic back pressure regulator 450. In this embodiment, the gauge pressure sensor is omitted, and an absolute pressure sensor 476, similar to the absolute pressure sensor 376 of FIG. 3, is located at the output 408 of the sample valve 404 to supply an absolute pressure signal representing the absolute pressure at connection 454, via connection 456 to the closed loop controller 458.

An absolute pressure setpoint can be electronically programmed into the closed loop controller 458. The pressure setpoint can also be electronically controlled via, for example, a personal computer, or other controller, to be described below, according to user input or according to a program. Using the absolute pressure setpoint information and the absolute pressure signal from the absolute pressure sensor 476, the closed loop controller 458 controls the adjustable input 472 of the proportional valve 464 via connection 462 to controllably alter the pressure at the output 408 of the sample valve 404. In this manner, the pressure inside the sample loop, and the pressure as the sample is injected into the GC inlet 412, can be controlled based on the user entered absolute pressure setpoint, or on a programmed pressure setting. Such an implementation allows the GC 400 to provide a sample stream that is largely independent of barometric pressure, and allows the absolute back pressure of the GC 400 to be electronically controlled.

Figure 5:
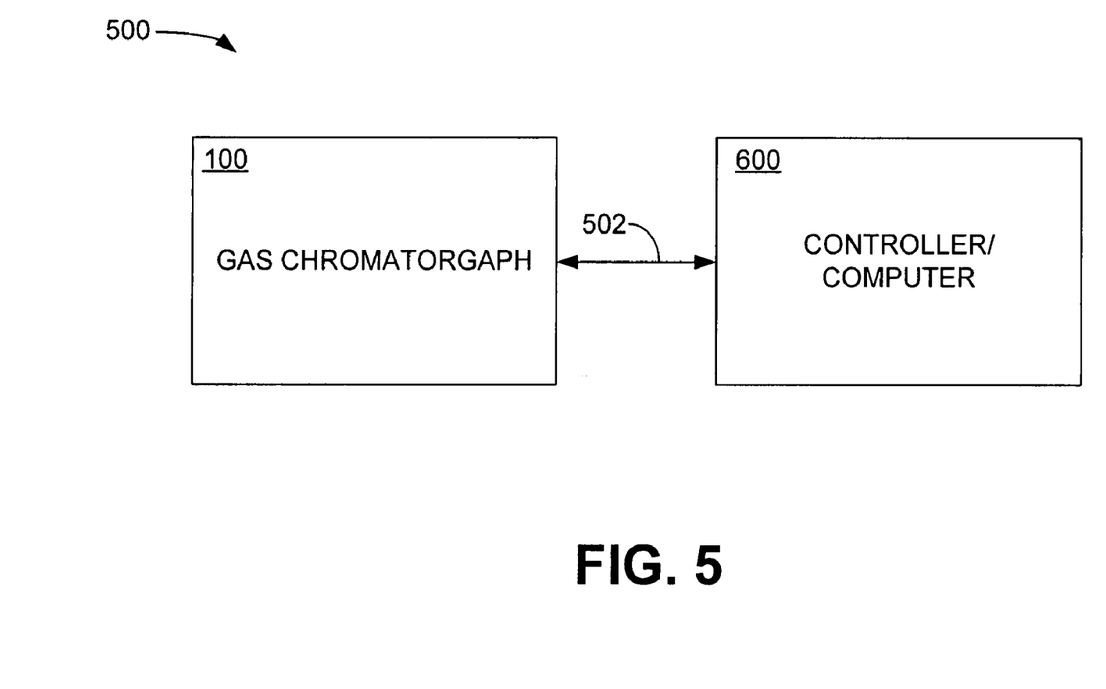
FIG. 5 is a block diagram illustrating a system including a GC and a controller/computer.

FIG. 5 is a block diagram illustrating a system 500 including a GC 100 and a controller/computer 600. The GC 100 is coupled to the controller/computer 600 by a bi-directional connection 502. The GC 100 separates and detects compounds in a sample matrix, as described above, and creates retention time data for each compound. The controller/computer 600 controls functionality, data acquisition and data processing relating to the GC 100. The controller 600 can be, for example, a computer, a computerized controller, or other type of computing device that includes processing, interface, and software components that are used to control all aspects of the GC 100. Alternatively, the functionality of the controller 600 may be incorporated into the GC 100.

Figure 6:
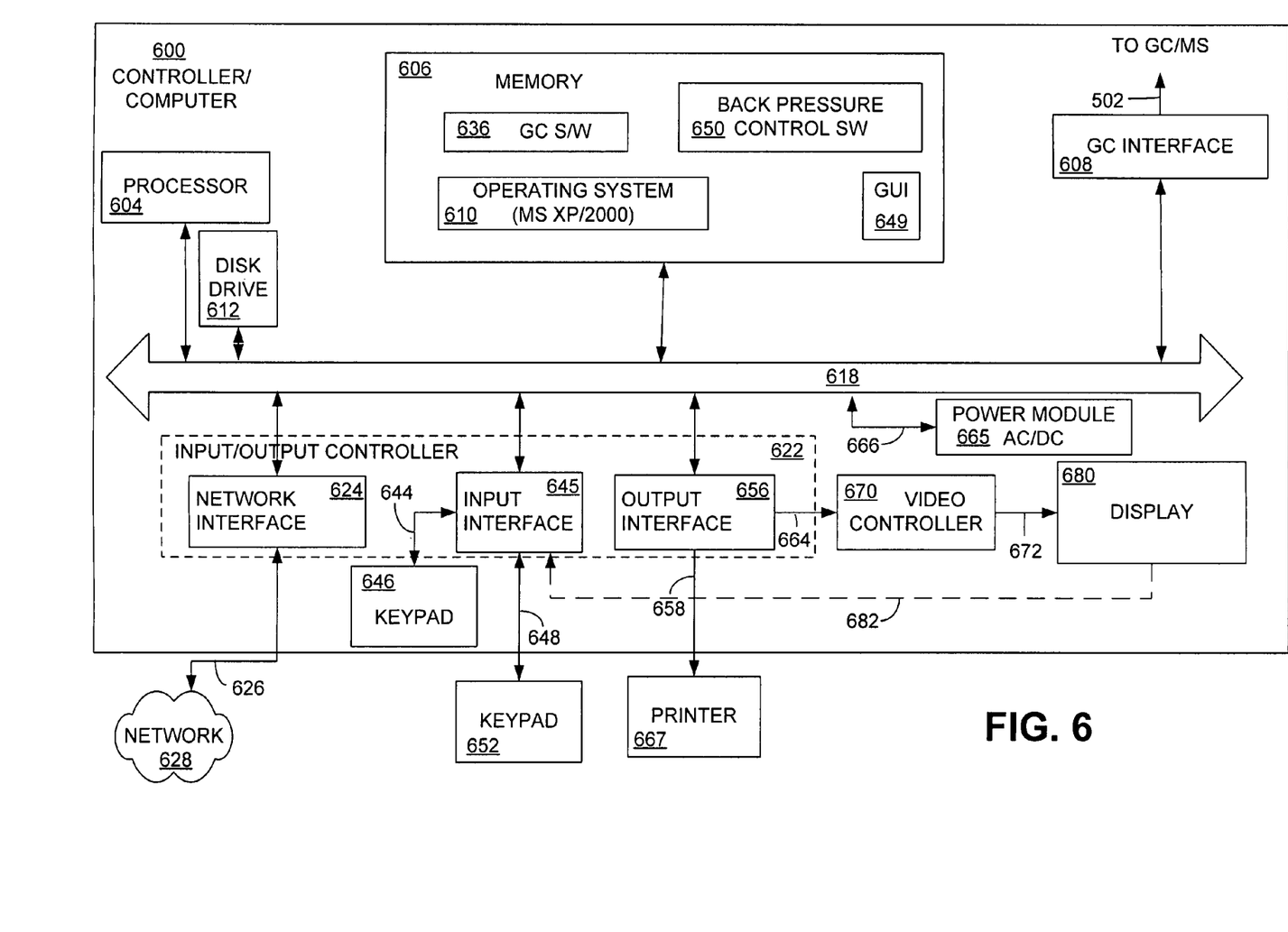
FIG. 6 is a block diagram illustrating an exemplary controller/computer constructed in accordance with an embodiment of the invention.

FIG. 6 is a block diagram illustrating an exemplary controller/computer 600 constructed in accordance with an embodiment of the invention. Generally, in terms of hardware architecture, as shown in FIG. 6, the computer 600 includes a processor 604, memory 606 (one or more random access memory (RAM) elements, read only memory (ROM) elements, etc.), an optional removable media disk drive 612, a gas chromatograph interface 608, referred to as a "GC interface 208," through which the controller 600 couples to the GC 100 (FIG. 5), an input/output controller 622 and a power module 665 that are connected together and that communicate with each other via a local interface 618. The local interface 618 can be, for example but not limited to, one or more buses or other wired or wireless connections, as is known to those having ordinary skill in the art. The local interface 618 may have additional elements, which are omitted for simplicity, such as buffers (caches), drivers, and controllers, to enable communications. Further, the local interface 618 includes address, control, and data connections to enable appropriate communications among the aforementioned components.

The processor 604 is a hardware device for executing software that can be stored in memory 606. The processor 604 can be any suitable processor for implementing the functionality of the controller/computer 600. In one embodiment, the controller/computer 600 executes on a personal computer (PC).

The memory 606 can include any one or a combination of volatile memory elements (e.g., random access memory (RAM, such as DRAM, SRAM, etc.)) and nonvolatile memory elements (e.g., NVRAM, ROM, hard drive, tape, CDROM, etc.). Moreover, the memory 606 may incorporate electronic, magnetic, optical, and/or other types of storage media. Note that the memory 606 can have a distributed architecture, where various components are situated remote from one another, but can be accessed by the processor 604.

The software in memory 606 may include one or more separate programs, each of which comprise one or more code segments, which are an ordered listing of executable instructions for implementing logical functions. In the example of FIG. 6, the software in the memory 606 includes software in the form of gas chromatograph (GC) software 636 and back pressure control software 650. In an alternative embodiment, the back pressure control software 650 may be integrated into the GC software 636. The GC software 636 can be, for example, a proprietary software module that performs the GC analysis described above using retention time analysis. The back pressure control software 650 can include the logic and program instructions for controlling the back pressure of the GC 100 described above.

The memory 606 also includes a graphical user interface (GUI) 649. The GUI 649 provides a graphical user interface for the controller/computer 600 and also displays information to a user on the display 680. The memory 606 also includes one or more operating software modules, collectively referred to as operating system (O/S) 610. The O/S 610 may include software modules that perform some of the functionality of the controller/computer 600 not specifically described herein.

In a preferred embodiment, the O/S 610 is the commonly available Microsoft 2000 or XP operating system available from Microsoft. However, other operating systems may be used. The operating system 610 essentially controls the execution of other computer programs, such as the GC software 636, and the back pressure control software 650. The processor 604 and operating system 610 define a computer platform, for which application programs, such as the GC software 636 and the back pressure control software 650, are written in higher level programming languages. The GC software 636 and the back pressure control software 650 include the executable instructions that allow the controller/computer 600 to control the back pressure of the sample in the sample loop, and detect, separate and identify target compounds in a sample matrix.

The input/output controller 622 includes a network interface 624, an input interface 645 and an output interface 656 each in communication with the local interface 618. The network interface 624 couples the controller/computer 600 to an external network 628 via connection 626. The external network can be any network to which the controller/computer 600 may couple to exchange information. The input interface 645 is coupled to an internal keypad 646 via connection 644 and to an external keypad 652 via connection 648. The internal keypad 646 is located on the controller/computer 600 while the external keypad 652 is an auxiliary keypad to which the controller/computer 600 may be coupled.

The output interface 656 is coupled to a printer 667 via connection 658. The printer 667 can be used to provide a permanent record of the analysis results obtained by GC 100 under the control of the controller/computer 600. The output interface 656 also couples to a video controller 670 via connection 664. The video controller 670 couples to a display 680 via connection 672. The display 680 can be an LCD touch screen display capable of receiving input from a user, but may be any type of suitable display.

The disk drive 612 can be any storage element or memory device, and as used herein, generally refers to flash memory, sometimes referred to as compact flash (CF) or PC card.

The power module 665 can power the controller/computer 600 from an AC power source, or can include batteries and a built in charger to provide portable DC power. The GC interface 608 provides both electrical and mechanical interfaces to a GC device.

When the controller/computer 600 is in operation, the processor 604 is configured to execute software stored within the memory 606, to communicate data to and from the memory 606 and to generally control operations of the controller/computer 600 and the GC 100 (FIG. 5) pursuant to the software.

When portions of the controller/computer 600 are implemented in software, as is shown in FIG. 6, it should be noted that the O/S 610, GC software 636 and the back pressure control software 650 can be stored on any computer readable medium for use by or in connection with any computer related system or method. In the context of this document, a computer readable medium is an electronic, magnetic, optical, or other physical device or means that can contain or store a computer program for use by or in connection with a computer related system or method. The O/S 610, GC software 636 and the back pressure control software 650 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device.

The computer readable medium can be, for example but not limited to, an electronic, magnetic, optical, electromagnetic, infrared, or semiconductor system, apparatus, device, or propagation medium. More specific examples (a non-exhaustive list) of the computer-readable medium include the following: an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

The hardware components of the controller/computer 600 can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Figure 7:
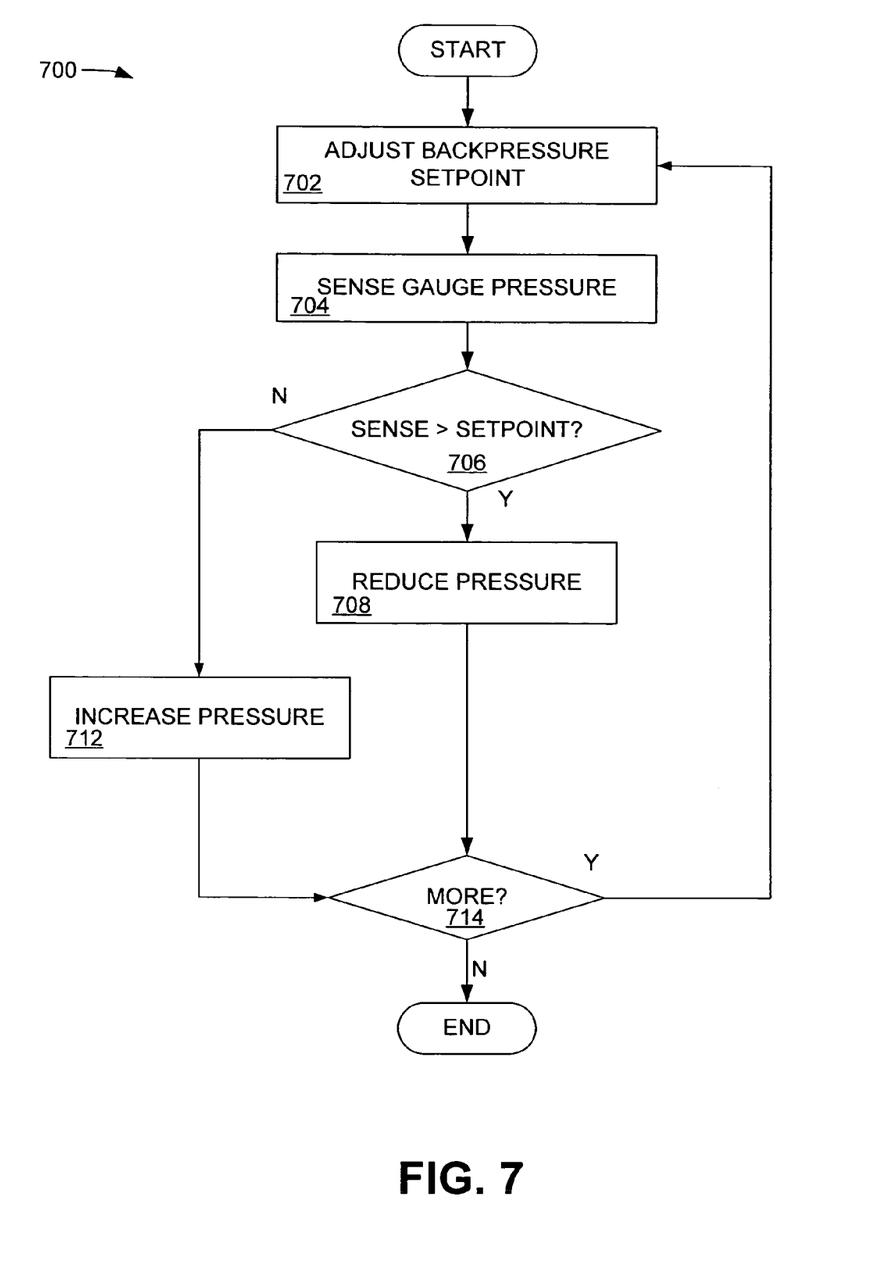
FIG. 7 is a flow chart describing the operation of the embodiment of the electronic back pressure regulator shown in FIG. 1.

FIG. 7 is a flow chart 700 describing the operation of the embodiment of the electronic back pressure regulator shown in FIG. 1. In block 702, the backpressure setpoint is adjusted. The back pressure setpoint can be adjusted by, for example, a user entering the setpoint via the user interface 649 (FIG. 6) of the controller 600. Alternatively, the set point may be automatically set by the back pressure control software 650 of FIG. 6. In block 704, the gauge pressure sensor 152 provides a gauge pressure reading to the closed loop controller 158. In block 706 the back pressure control software 650 determines whether the gauge pressure is above the set point valve. If the gauge pressure is above the set point value, then, in block 708 the back pressure control software 650 causes the closed loop controller 158 to reduce the pressure by increasing the vent capacity of the proportional valve 164. If, however, in block 706 it is determined that the sense pressure is below the set point, then, in block 712, the backpressure control software 650 causes the closed loop controller 158 to control the proportional valve 172 so as to increase the pressure in the sample loop 230. After the pressure is reduced in block 708 or increased in block 712, the process proceeds to block 714.

In block 714 it is determined whether any additional pressure adjustment is needed. In accordance with the operation of the closed loop controller, continuous closed loop operation continues as the process returns to block 702. If no additional pressure adjustment is needed, the process ends.

Figure 8:
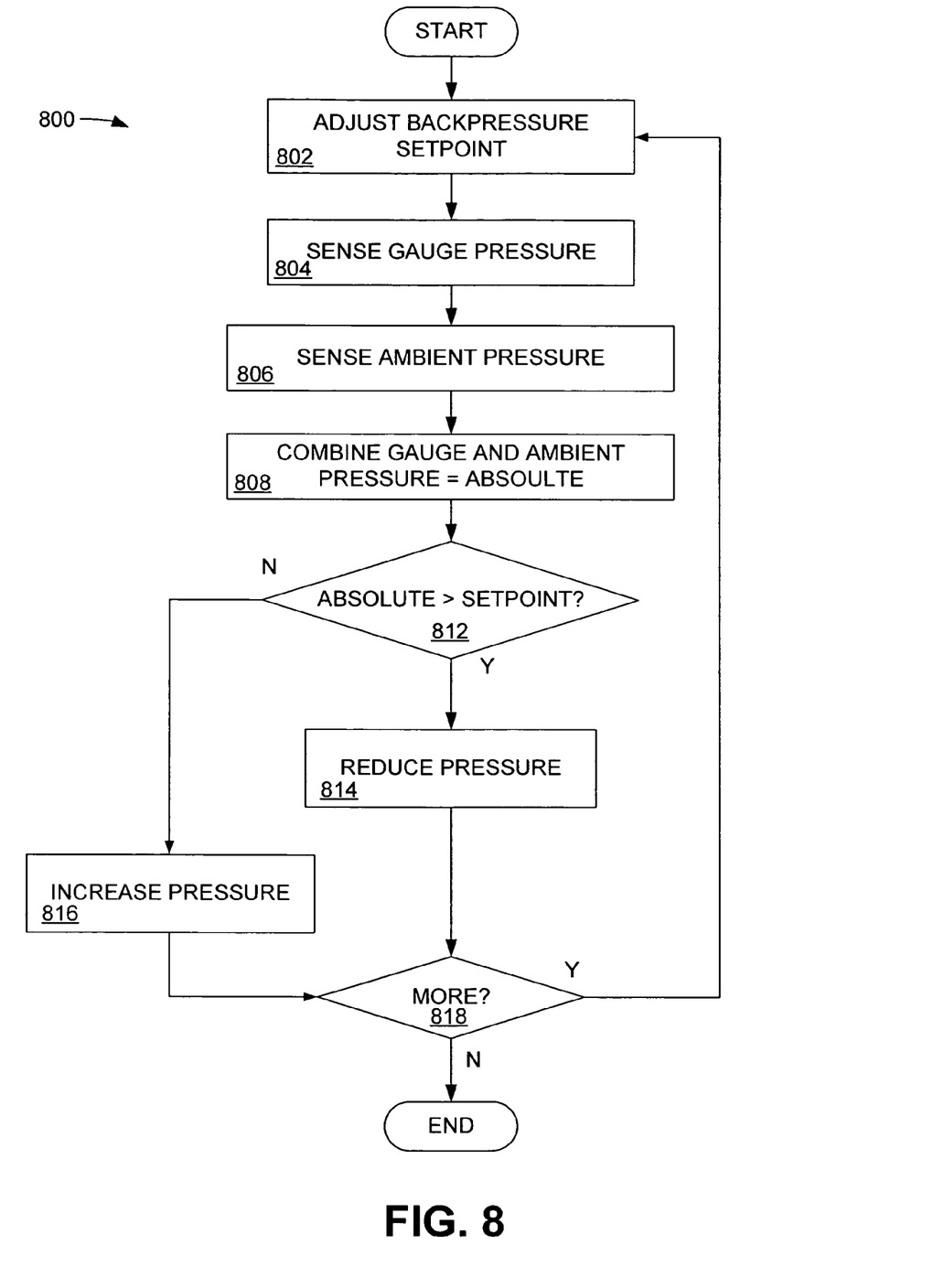
FIG. 8 is a flow chart describing the operation of the embodiment of the electronically controlled back pressure regulator shown in FIG. 3.

FIG. 8 is a flow chart 800 describing the operation of the embodiment of the electronic back pressure regulator shown in FIG. 3. In block 802, the backpressure setpoint is adjusted. The back pressure setpoint can be adjusted by, for example, a user entering the setpoint via the user interface 649 (FIG. 6) of the controller 600. Alternatively, the set point may be automatically set by the back pressure control software 650 of FIG. 6. In block 804, the gauge pressure sensor 352 delivers a gauge pressure signal to the closed loop controller 358. In block 806, the absolute pressure sensor delivers a signal representing the ambient pressure via connection 378 to the closed loop controller 358. In block 808, the back pressure control software 650 arithmetically combines the gauge pressure reading and the ambient pressure reading to arrive an absolute pressure value. In block 812, it is determined whether the absolute pressure is greater that the set point value. If the absolute pressure is greater than the set point value, then, in block 814, the closed loop controller 358 controls the proportional value 364 to reduce the pressure at the output of the sample valve 304, and thereby, the pressure within the sample loop 230. If however, in block 812 it determined that the absolute pressure value is below the set point, then, in block 816, the closed loop controller 358 controls the proportional valve 364 to increase the pressure at the out put of the sample valve 304, and thereby, increase the pressure within the sample loop 230. After the pressure is reduced in block 814 or increased in block 816, the process proceeds to block 818.

In block 818 it is determined whether any additional pressure adjustment is needed. In accordance with the operation of the closed loop controller, continuous closed loop operation continues as the process returns to block 802. If no additional pressure adjustment is needed, the process ends.

Figure 9:
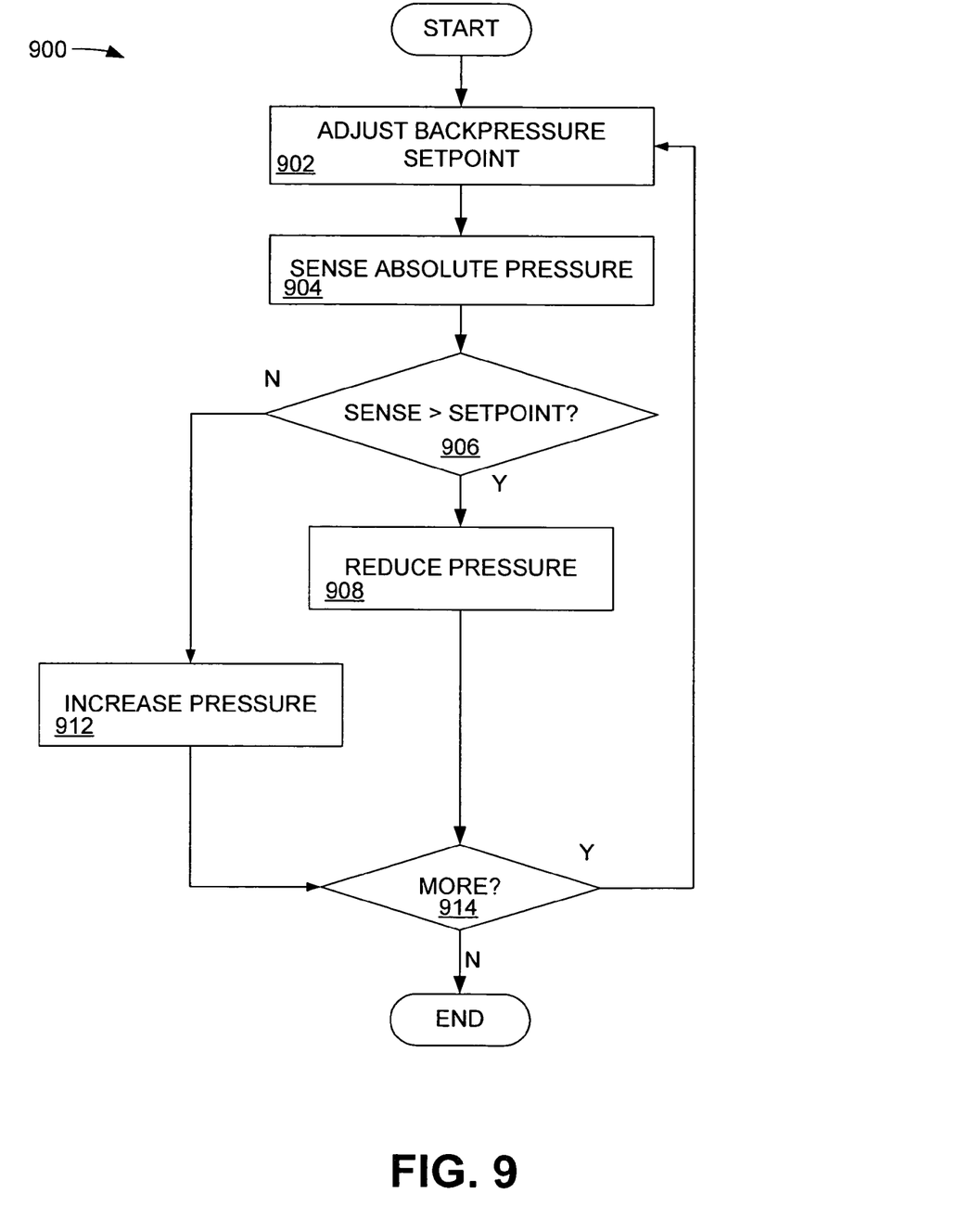
FIG. 9 is a flow chart describing the operation of the embodiment of the electronic back pressure regulator shown in FIG. 4.

FIG. 9 is a flow chart 900 describing the operation of the embodiment of the electronic back pressure regulator shown in FIG. 4. In block 902, the backpressure setpoint is adjusted. The back pressure setpoint can be adjusted by, for example, a user entering the setpoint via the user interface 649 (FIG. 6) of the controller 600. Alternatively, the set point may be automatically set by the back pressure control software 650 of FIG. 6. In block 904, the absolute pressure sensor 476 provides an absolute pressure reading to the closed loop controller 458. In block 906 the back pressure control software 650 determines whether the absolute pressure is above the set point valve. If the absolute pressure is above the set point value, then, in block 908 the back pressure control software 650 causes the closed loop controller 458 to reduce the pressure by increasing the vent capacity of the proportional valve 464. If, however, in block 906 it is determined that the sense pressure is below the set point, then, in block 912, the backpressure control software 650 causes the closed loop controller 458 to control the proportional valve 472 so as to increase the pressure in the sample loop 230. After the pressure is reduced in block 908 or increased in block 912, the process proceeds to block 914.

In block 914 it is determined whether any additional pressure adjustment is needed. In accordance with the operation of the closed loop controller, continuous closed loop operation continues as the process returns to block 902. If no additional pressure adjustment is needed, the process ends.

An elevated back pressure also reduces condensation that may occur within the sample loop 230 as the pressure of the sample is reduced as it is injected into the GC inlet 112, and into the GC column. In accordance with the embodiments of the invention described above, the absolute back pressure at the output of the sample valve can be electronically controlled and can be saved as part of the instrument set-up and automatically recalled, thereby eliminating a manual set-up operation. Further still, because all the flows within the GC 100, 300 and 400 are independent, problems in which all of the material flows through the back pressure regulator are eliminated. Locating the electronic back pressure regulator 150, 350 and 450 downstream of the analysis sample point (i.e. the GC inlet), eliminates cross contamination between sample and vent flow.

The electronically controlled back pressure regulator can be used in other implementations. For example, the electronic back pressure regulator can be used in what is referred to as a "head space sampler." A head space sampler is used to sample the vapor above a liquid/solid sample. A vial containing the sample is heated to increase the amount of sample in the vapor phase and pressurized with an inert gas. This 'pressurized headspace' is then vented to ambient via a sample valve as described above. This represents a specific application/apparatus that provides the sample (302) shown in FIG. 3.

The electronically controlled back pressure regulator can also be used in multi-level calibration of a detector in an analysis device. Because no detector is purely linear in response, it is common in chromatography for the detector to be calibrated over a range of inlet concentrations. This is referred to as a "multi-level calibration." Since some sample types (e.g. concentration standards for $AsH_3$, arsine) are very expensive, a system that can vary the quantity (i.e. number of moles of the analyte) in the sample loop, thus allowing only one concentration standard to be used to provide a range of concentrations for the detector multi-level calibration, would be beneficial.

The electronically controlled back pressure regulator can also be used to provide repeatable measurements over changes in atmospheric pressure of the caloric content of natural gas.

The electronically controlled back pressure regulator can also be used in a gas mixing system. To calibrate analytic instrumentation that can produce measurement data on multiple compounds simultaneously (e.g. atomic emissions detector, Ultra Violet-Visible detector, mass spectrometer, etc.) a gas mixing system can be used. One way of constructing such a gas mixing system is to implement a separate flow controller for each reagent gas to be combined, and to combine all the flow controller outputs. The setpoints of the multiple flow controllers can be used to determine the 'mixture' percentages. This mixture is then applied to a gas sampling valve. Locating an absolute back pressure regulator in accordance with embodiments of the invention at the outlet of such a sampling valve allows the overall quantity (i.e. number of moles of the analyte) of the mixed gas to be varied, independently of the mixture percentages.

The foregoing detailed description has been given for understanding exemplary implementations of the invention only and no unnecessary limitations should be understood therefrom as modifications will be obvious to those skilled in the art without departing from the scope of the appended claims and their equivalents.

We claim:

1. A gas chromatography system, comprising:
    a sample valve having a vent path and a sample loop that loads a sample before the sample is injected into a column via an inlet, wherein the sample valve has a separate output coupled to the inlet;
    a back pressure regulator coupled between the vent path and a vent to control and modify pressure in the sample loop during loading and sample injection, further comprising
        a proportional valve coupled to the vent path and the vent;
        a pressure sensor coupled to the vent path and coupled to receive a reference pressure to determine pressure in the vent path with respect to the reference pressure; and
        a closed-loop controller coupled to the pressure sensor and the proportional valve, and coupled to receive a predetermined pressure setpoint, wherein the closed-loop controller controls the proportional valve to regulate a flow through the vent path based on the determined pressure in the vent path and the pressure setpoint so as to control and modify the pressure in the sample loop, and the amount of sample in the sample loop prior to injection of the sample into the column.

2. The gas chromatography system of claim 1, wherein the pressure sensor is a gauge pressure sensor and the reference pressure is an ambient pressure.

3. The gas chromatography system of claim 1, wherein the closed-loop controller determines if a valve of the pressure signal from the pressure sensor is greater than that of the pressure setpoint and, if so, controls the proportional valve to reduce the pressure in the vent path so as to control and modify the pressure in the sample loop.

4. The gas chromatography system of claim 1, wherein the closed-loop controller determines if a value of the pressure signal from the pressure sensor is less than that of the pressure setpoint and, if so, controls the proportional valve to increase the pressure in the vent path so as to control and modify the pressure in the sample loop.

5. The gas chromatography system of claim 1, wherein the pressure setpoint is adjustable.

6. The gas chromatography system of claim 1, wherein the pressure sensor is a gauge pressure sensor and the reference pressure is an ambient pressure, and wherein the back pressure regulator further comprises an absolute pressure sensor configured to deliver a signal representative of the ambient pressure to the closed-loop controller, wherein the closed-loop controller determines absolute pressure in the vent path by arithmetically combining pressure signal from the gauge pressure sensor the ambient pressure signal from the absolute pressure sensor.

7. The gas chromatography system of claim 6, wherein the pressure setpoint is an absolute pressure setpoint.

8. The gas chromatography system of claim 7, wherein the closed-loop controller determines if a value of the absolute pressure in the vent path is greater than that of the pressure setpoint and, if so, controls the proportional valve to reduce the pressure in the vent path so as to control and modify the pressure in the sample loop.

9. The gas chromatography system of claim 7, wherein the closed-loop controller determines if a value of the absolute pressure in the vent path is less than that of the pressure setpoint and, if so, controls the proportional valve to increase the pressure in the vent path so as to control and modify the pressure in the sample loop.

10. The gas chromatography system of claim 1, wherein the pressure sensor is an absolute pressure sensor and the reference pressure is an absolute pressure.

11. The gas chromatography system of claim 10, wherein the pressure setpoint is an absolute pressure setpoint.

12. The gas chromatography system of claim 10, wherein the closed-loop controller determines if a value of the absolute pressure in the vent path is greater than that of the pressure setpoint and, if so, controls the proportional valve to reduce the pressure in the vent path so as to control and modify the pressure in the sample loop.

13. The gas chromatography system of claim 10, wherein the closed-loop controller determines if a value of the absolute pressure in the vent path is less than that of the pressure setpoint and, if so, controls the proportional valve to increase the pressure in the Vent path so as to control and modify the pressure in the sample loop.

* * * * *